(12) United States Patent
Townson

(10) Patent No.: US 7,900,990 B2
(45) Date of Patent: Mar. 8, 2011

(54) UNIVERSAL CARGO RAIL CLAMP

(75) Inventor: James M. Townson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/113,442

(22) Filed: May 1, 2008

(65) Prior Publication Data

US 2009/0274531 A1 Nov. 5, 2009

(51) Int. Cl.
*B60P 7/04* (2006.01)
(52) U.S. Cl. .................. 296/100.16; 410/104
(58) Field of Classification Search .......... 160/368.1, 160/327; 410/104; 296/100.15, 100.16, 296/100.17, 100.18, 136.03; 135/907
See application file for complete search history.

(56) References Cited

U.S. PATENT DOCUMENTS

| 5,636,893 | A | 6/1997 | Wheatley et al. |
| 6,164,882 | A | 12/2000 | Selle |
| 2001/0002973 | A1 | 6/2001 | Price |
| 2004/0245800 | A1 * | 12/2004 | Wheatley |

* cited by examiner

*Primary Examiner* — Stephen Gordon
(74) *Attorney, Agent, or Firm* — Quinn Law Group, PLLC

(57) ABSTRACT

An adjustable clamp assembly for attaching an accessory to a vehicle having a cargo rail. The assembly includes a rail clamp member attachable to the cargo rail and an adjustable clasp catcher operatively attached to the rail clamp member. A clasp is configured to selectively interface with one of at least two attachment features on the adjustable clasp catcher. An accessory fitting configured to accept attachment of the vehicle accessory is connected with respect to the clasp such that the accessory fitting is selectively attachable to the adjustable clasp catcher, thereby capable of attaching the accessory to the vehicle through the cargo rail. A locking member may be operatively attached to the clasp and configured to selectively exert a locking force between the clasp and adjustable clasp catcher.

15 Claims, 3 Drawing Sheets

UNIVERSAL CARGO RAIL CLAMP

TECHNICAL FIELD

This disclosure relates to mechanisms for attaching accessories to vehicles.

BACKGROUND OF THE INVENTION

It is known to provide a bed for a vehicle such as a pickup truck. Typically, the bed is rectangular in shape to define a cargo compartment and is closed at the end by a tailgate. The tailgate is hinged to the bed to have an upright position to close the end of the bed and a horizontal position to open the end of the bed. Other vehicles, such as sport-utility and crossover vehicles may also have small beds. Vehicle beds have traditionally been used to carry or haul cargo, but with the attachment of accessory devices, it may be possible to expand the utility of such vehicles.

Many of such vehicles sold today also have a cargo cover (or tonneau cover) to cover the bed. The cover may be made as a one-piece panel of a relatively strong and rigid material to comply with predetermined strength and performance specifications. Multi-piece cargo covers are also available. These multi-piece foldable cargo covers are usually flat, hard plastic. Anther type of tonneau cover may be flexible cloth or vinyl, and uses a rib-like system to support the fabric and keep the cover taut.

SUMMARY

An adjustable clamp assembly for attaching an accessory to a vehicle having a cargo rail is provided. The assembly includes a rail clamp member attachable to the cargo rail and an adjustable clasp catcher operatively attached to the rail clamp member. A clasp is configured to selectively interface with one of at least two attachment features on the adjustable clasp catcher. An accessory fitting configured to facilitate attachment of the accessory to the vehicle is connected with respect to the clasp such that the accessory fitting is selectively lockable to the adjustable clasp catcher, and thereby capable of attaching the accessory to the vehicle through the cargo rail.

A locking member may be operatively attached to the clasp and configured to selectively exert a locking force between the clasp and adjustable clasp catcher. A clasp housing portion may be operatively attached to the accessory fitting and interposed between the locking member and adjustable clasp catcher. Furthermore, a slide lock may be operatively attached to the rail clamp member to selectively restrict movement of the rail clamp member along the cargo rail in predetermined positions along the cargo rail.

The above features and advantages and other features and advantages of the claimed invention are readily apparent from the following detailed description of the best modes and other embodiments for carrying out the claimed invention when taken in connection with the accompanying drawings.

DESCRIPTION OF EMBODIMENTS

Figure 1:
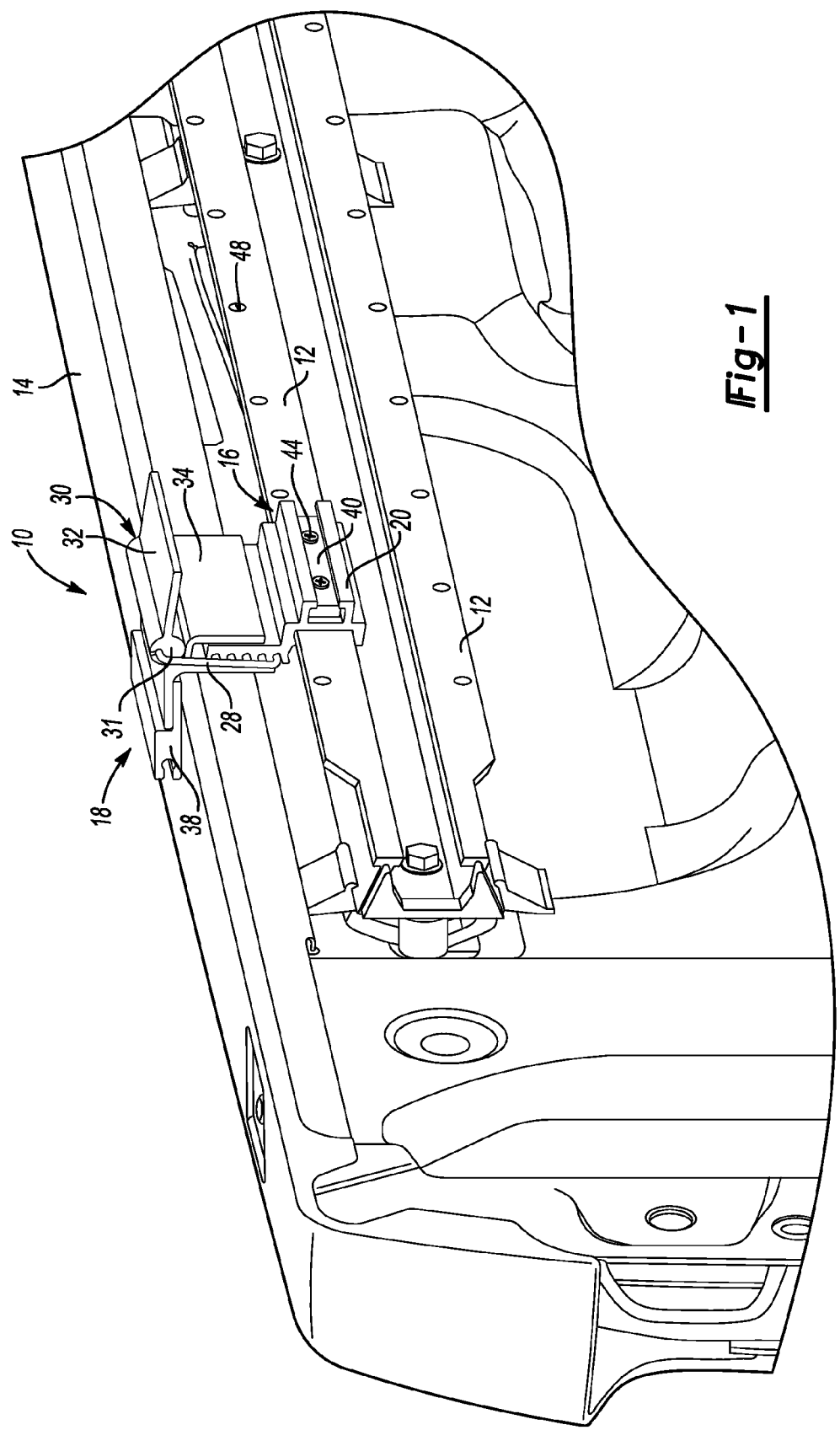
FIG. 1 is a schematic perspective view of an embodiment of a rail clamp assembly attached to a cargo rail on a bed rail of a pickup bed.

Referring to the drawings, wherein like reference numbers correspond to like or similar components throughout the several figures, FIG. 1 shows an embodiment of a universal cargo rail clamp assembly 10. In this application, the rail clamp assembly 10 is attached to a cargo rail 12 which is attached to a bed rail 14 of a pickup truck bed (not fully shown). The rail clamp assembly 10 is composed generally of two mechanisms: an adjustable rail clamp mechanism 16 and an accessory attachment mechanism 18.

Those skilled in the art will recognize that the embodiment of the cargo rail 12 shown in FIG. 1 is only one possible type of cargo rail 12 to which the rail clamp assembly 10 may be attached within the scope of the claims. Other systems may include, without limitation: rails placed on top of the bed rail 14, rails molded into the top or side edges of the bed rail 14, rails mounted on the floor (not shown) of the bed, intermittent portions (as opposed to continuous) of cargo rail, or rail portions mounted to, or molded in, the front wall (not shown) or tailgate (not shown) of the bed.

Figure 2:
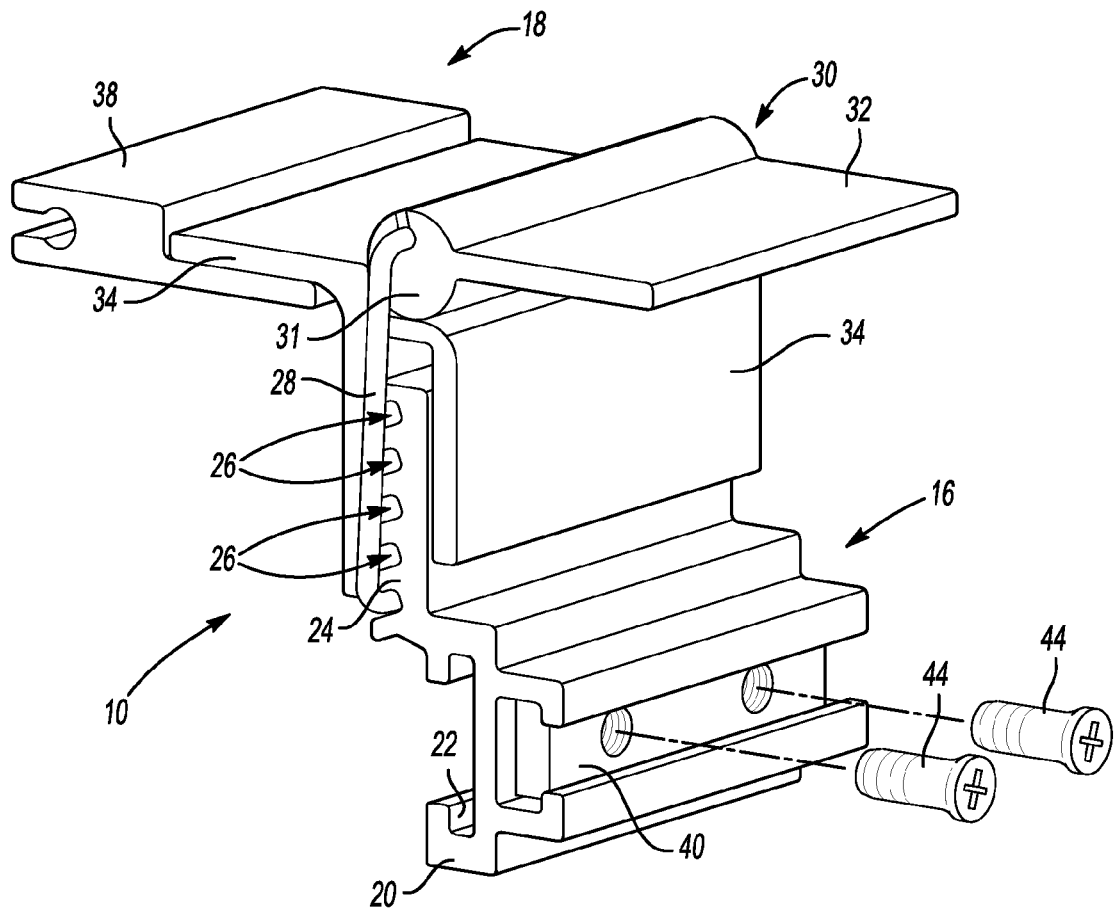
FIG. 2 is a schematic close up perspective view of the rail clamp assembly of FIG. 1, shown removed from the cargo rail.

FIG. 2 shows the rail clamp assembly 10 of FIG. 1 in greater detail. A rail clamp member 20 is configured to attach to the cargo rail 12 which is positioned in a rail channel 22 shaped such that its surfaces are lockable to the cargo rail 12. In this embodiment, the cargo rail 12 rides inside of the rail clamp member 20. However, the rail clamp member 20 could be configured to sit entirely or partially within the cargo rail 12, which would place the contact areas of the rail channel 22 on the outer surfaces of rail clamp member 20. Depending upon the configuration, the rail clamp member 20 may be installed by sliding it onto an open end of cargo rail 12, or the rail clamp member 20 may be rotated or snapped directly into its location on the cargo rail 12.

Operatively attached to the rail clamp member 20 is an adjustable clasp catcher 24. In this embodiment the adjustable clasp catcher 24 is oriented generally vertically with respect to the vehicle, with the adjustable rail clamp mechanism 16 below the accessory attachment mechanism 18. However, other orientations (such as horizontal or angular) may be utilized within the scope of the claims.

The adjustable clasp catcher 24 may be integrally formed with the rail clamp member 20—such as by extrusion—from a single piece of material, as is shown in FIG. 2. As will be recognized by those skilled in the art, however, it is not necessary to form these elements together. The rail clamp member 20 and adjustable clasp catcher 24 could be separately formed and bonded together, such as by, without limitation: welding, adhesives, fasteners, or another form of bonding.

Adjustable clasp catcher 24 includes at least two attachment features 26. In the embodiment shown in FIG. 2, there are five attachment features 26, each of which is configured to lock, grasp, or connect to a clasp 28. In this embodiment, the attachment features 26 are slots or channels and the clasp 28 is U-shaped, with a bar portion that slides into the slots. Those skilled in the art will recognize numerous other shapes for the clasp 28 and corresponding attachment features 26 that may be utilized within the scope of the claims. Furthermore, the clasp 28 could be designed such that it simultaneously interfaces with more than one of the attachment features 26 (having two parallel bar portions, for example).

By varying the specific attachment feature 26 to which the end of the clasp 28 connects or locks, the relative distance between the cargo rail 12 and clasp 28 is varied. This adjustability allows the rail clamp assembly 10 to be used with vehicles having different distances (vertical or otherwise) between the cargo rail 12 and the top of the bed rail 14. In FIG. 2, clasp 28 is locked to the lowest (as viewed in FIG. 2) attachment feature 26, such that the adjustable rail clamp mechanism 16 is in its closest position with respect to accessory attachment mechanism 18.

Clasp 28 is actuated by a locking member 30, which selectively exerts or applies a locking force between the clasp 28 and one of the attachment features 26. Locking member 30 therefore substantially fixes the position of the adjustable rail clamp mechanism 16 relative to the accessory attachment mechanism 18. In the embodiment of FIG. 2, the locking member 30 further includes a lever 32 configured to actuate the locking member 30 when rotated counter clockwise (as viewed in FIG. 2). The lever 32 and locking member 30 are shown in the locked position in FIGS. 1 and 2 (and, as further described below, also FIG. 3).

Those skilled in the art will recognize myriad other ways to actuate the locking member 30, and will further recognize that lever 32 does not have to be actuated exactly, or even similarly, as shown. An additional included feature of the embodiment of the locking mechanism 30 shown in FIG. 2 is an over-center cam 31, which is the generally cylindrical portion of locking mechanism 30. The over-center cam 31 is one way to cause the clasp 28 to apply force. Because the clasp 28 is attached to the over-center cam 31 above the axis of the cylinder, as the over-center cam 31 rotates, clasp 28 raises and increases the force transferred to the adjustable clasp catcher 24.

Accessory attachment mechanism 18 is held to the locking mechanism 30—and therefore the adjustable rail clamp mechanism 16—by a clasp housing portion 34. In the embodiment shown, clasp housing 34 partially covers and surrounds the adjustable clasp catcher 24. However, complete or partial coverage is not required. In this embodiment, the clasp housing 34 provides structure configured to align the clasp 28 while the locking mechanism 30 is disengaged.

An accessory fitting 38 is operatively attached to the clasp housing portion 34. This attachment may be achieved by welding, adhesives, fasteners, or any other bonding method acceptable to those having ordinary skill in the art. In this embodiment, the accessory fitting 38 sits horizontally on top of, and generally parallel to, the top surface of the bed rail 14. Other embodiments within the scope of the claims, however, may include vertically or angularly-oriented accessory fittings 38, and the orientation need not be parallel to the top of the bed rail 14.

Accessory fitting 38 provides structure configured to attach one or more accessories (concurrently or alternatively) to the vehicle. Furthermore, as will be recognized by those skilled in the art, the accessory fitting 38 may be integrally formed with the clasp housing portion 34—such as by extrusion—from a single piece of material.

Those having ordinary skill in the art will recognize a large range of accessories attachable to the accessory fitting 38 within the scope of the claims. Some exemplary accessories, without limitation of size, structure, or function, are: hardcover cargo covers, soft tonneau covers, tool boxes or other equipment storage units, cargo-transportation and hauling equipment, and camper tops, tents or other recreational structures. Such a wide range of attachable accessories is accommodated by myriad designs for the accessory fitting 38 within the scope of the claims. Furthermore, different accessories may require different numbers of universal cargo rail clamps 10 to be used on the vehicle, and may vary the overall size and strength of each rail clamp assembly 10 used. In the embodiment shown in FIG. 2, the accessory fitting 38 is configured for attachment of a soft tonneau cover (of cloth, vinyl, leather, rubber, or the like) having a rib or rib-like portions.

Those having ordinary skill in the art will further recognize that the locking member 30 may generate enough force between the cargo rail 12 and the bed rail 14 to hold the rail clamp assembly 10 in place on the cargo rail 12. Some embodiments, such as that shown in FIG. 2, may include a slide lock 40 configured to selectively restrict movement, and allow adjustment, of the rail clamp assembly 10 along the cargo rail 12. This slide lock 40 restricts movement by turning a bolt 44 or other device to apply pressure between the rail clamp member 20 and the cargo rail 12. The slide lock 40 may be configured as a separate component, or integrally formed into the rail clamp member 20.

Figure 3:
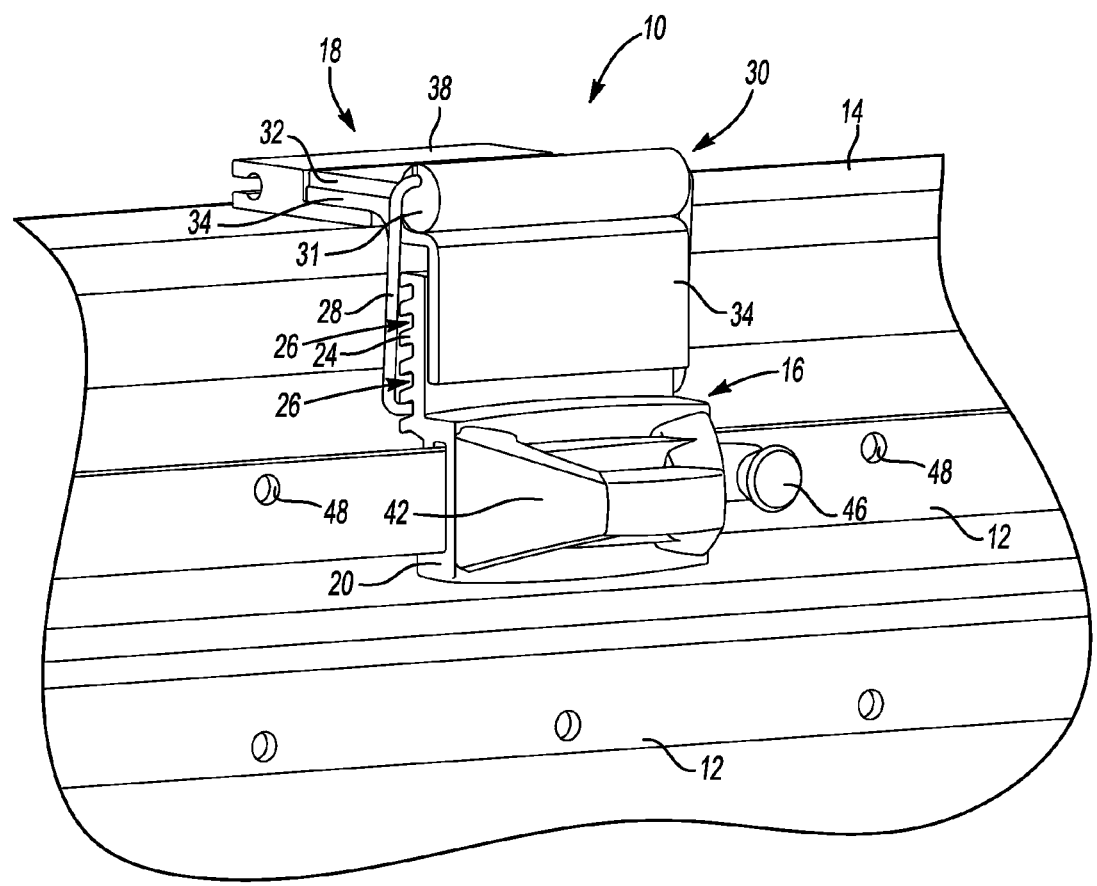
FIG. 3 is a schematic perspective view of another embodiment of a rail clamp assembly having a pin-lock and different lever configuration, and shown attached to a cargo rail on a bed rail of a pickup bed.

Another embodiment, shown in FIG. 3, further includes a pin-lock 42. Unlike the slide lock 40, the pin-lock 42 includes a pin 46 which selectively interfaces with holes 48 in the cargo rail 12. The holes 48 are configured to receive the pin 46, such that by pulling or disengaging the pin 46, the rail clamp assembly 10 is free to slide along cargo rail 12. The pin 46 may then be pushed back—possibly by a spring (not shown) biasing the pin 46 toward the cargo rail—into one of the holes 48 to lock the rail clamp assembly 10 into one of the corresponding, predetermined positions along cargo rail 12. Note also that, in the embodiment of FIG. 3, the lever 32 is positioned such that the clasp 28 is locked by rotating the lever 32 into contact with the clasp housing 34.

While the best modes for carrying out the claimed invention have been described in detail, those familiar with the art to which this invention relates will recognize various alternative designs and embodiments for practicing the invention within the scope of the appended claims.

The invention claimed is:

1. An adjustable clamp assembly for attaching an accessory to a vehicle having a cargo rail, comprising:
   a rail clamp member configured to be attachable to the cargo rail;
   a slide lock operatively attached to said rail clamp member and having a pin, wherein said pin is configured to selectively interface with the cargo rail such that said slide lock is capable of selectively restricting movement at predetermined attachment positions along the cargo rail;
   an adjustable clasp catcher operatively attached to said rail clamp member, and having at least two attachment features;
   a clasp configured to selectively interface with at least one of said attachment features; and
   an accessory fitting connected with respect to said clasp such that said accessory fitting is selectively attachable to said adjustable clasp catcher, wherein said accessory fitting is configured to receive the accessory.

2. The assembly of claim 1, further comprising a locking member operatively attached to said clasp, wherein said locking member is configured to selectively exert a locking force between said clasp and said adjustable clasp catcher.

3. The assembly of claim 2, further comprising a clasp housing portion operatively attached to said accessory fitting and interposed between said locking member and said adjustable clasp catcher.

4. The assembly of claim 3, wherein said locking member further includes an over-center cam.

5. The assembly of claim 4, wherein said accessory fitting is configured to receive a tonneau cover for the vehicle.

6. The assembly of claim 3, wherein said clasp housing portion and said accessory fitting are formed as a single piece.

7. The assembly of claim 3, wherein said rail clamp member and said adjustable clasp catcher are formed as a single piece.

8. The assembly of claim 7, wherein said locking member further includes an over-center cam.

9. An adjustable clamp assembly for attaching an accessory to a vehicle having a cargo rail, comprising:
- a cargo rail;
- a rail clamp member configured to be attachable to said cargo rail;
- an adjustable clasp catcher formed as a single piece with said rail clamp member, wherein said adjustable clasp catcher has at least two attachment features;
- a clasp configured to selectively interface with one of said attachment features;
- a locking member operatively attached to said clasp, wherein said locking member is configured to selectively exert a locking force between said clasp and said adjustable clasp catcher;
- an accessory fitting connected with respect to said clasp such that said accessory fitting is selectively lockable to said adjustable clasp catcher, wherein said accessory fitting is configured to receive the accessory; and
- a slide lock operatively attached to said rail clamp member and having a pin, wherein said pin is configured to selectively interface with the cargo rail such that said slide lock is capable of selectively restricting movement at predetermined attachment positions along the cargo rail.

10. The assembly of claim 9, further comprising a clasp housing portion operatively attached to said accessory fitting and interposed between said locking member and said adjustable clasp catcher.

11. The assembly of claim 9, wherein said attachment features include a first attachment feature and a last attachment feature, said last attachment feature and said first attachment feature being separated by a distance equal to or greater than approximately 25 millimeters.

12. The assembly of claim 11, wherein said locking member further includes an over-center cam.

13. An adjustable clamp assembly for attaching an accessory to a vehicle having a cargo rail, comprising:
- a rail clamp member configured to be attachable to the cargo rail;
- an adjustable clasp catcher operatively attached to said rail clamp member, and having at least two attachment features;
- a clasp configured to selectively interface with at least one of said attachment features;
- a locking member operatively attached to said clasp and having an over-center cam, wherein said locking member is configured to selectively exert a locking force between said clasp and said adjustable clasp catcher; and
- an accessory fitting connected with respect to said clasp such that said accessory fitting is selectively attachable to said adjustable clasp catcher, wherein said accessory fitting is configured to receive the accessory.

14. The assembly of claim 13, further comprising a slide lock operatively attached to said rail clamp member and having a pin, wherein said pin is configured to selectively interface with the cargo rail such that said slide lock is capable of selectively restricting movement at predetermined attachment positions along the cargo rail.

15. The assembly of claim 14, wherein said rail clamp member and said adjustable clasp catcher are formed as a single piece.

* * * * *